US007059505B2

(12) United States Patent
Tabor

(10) Patent No.: US 7,059,505 B2

(45) Date of Patent: Jun. 13, 2006

(54) METHOD AND SYSTEM FOR BREAKING A WEB PERFORATION

(75) Inventor: Jeffery M. Tabor, Appleton, WI (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 275 days.

(21) Appl. No.: 10/307,778

(22) Filed: Dec. 2, 2002

(65) Prior Publication Data

US 2004/0103972 A1 Jun. 3, 2004

(51) Int. Cl.

*B26F 3/02* (2006.01)
*B29C 65/00* (2006.01)
*B32B 37/00* (2006.01)

(52) U.S. Cl. ................. 225/2; 225/4; 225/93; 225/103; 156/66; 156/250; 156/510; 156/522

(58) Field of Classification Search ................. 156/66, 156/229, 250, 252, 253, 269, 270, 297, 299, 156/302, 494, 496, 510, 522, 558, 567; 225/2, 225/4, 5, 93, 94, 96, 965, 97, 98, 100, 103, 225/106

See application file for complete search history.

(56) References Cited

U.S. PATENT DOCUMENTS 3,488,778 A 1/1970 Goujon et al.
3,667,466 A 6/1972 Ralph
3,716,132 A 2/1973 Lewyckyj
3,835,754 A 9/1974 Lewyckyj
3,842,838 A 10/1974 Gellert
3,845,682 A 11/1974 Willhite et al.
4,217,327 A 8/1980 Cancio et al.
4,261,497 A * 4/1981 Roetter et al. .............. 225/100
4,269,188 A 5/1981 Nishizawa et al.
4,407,284 A 10/1983 Pieniak
4,480,000 A 10/1984 Watanabe et al.
4,561,579 A 12/1985 Fleming et al.
4,573,986 A 3/1986 Minetola et al.
4,608,115 A 8/1986 Schroth et al.
4,610,681 A 9/1986 Strohbeen et al.
4,619,649 A 10/1986 Roberts
4,646,362 A 3/1987 Heran et al.

(Continued)

FOREIGN PATENT DOCUMENTS

DE 198 13 334 A1 9/1999

(Continued)

OTHER PUBLICATIONS

Derwent Abstract and clipped image for SE 9702546.*

(Continued)

*Primary Examiner*—Gladys J P Corcoran
(74) *Attorney, Agent, or Firm*—Brinks Hofer Gilson & Lione

(57) ABSTRACT

An apparatus for breaking a perforation of a moving web includes a web conveyor adapted to move a web in a machine direction, wherein the web has at least one perforation, and at least one breaking member moveable between a first position and a second position. The at least one breaking member is adapted to be positioned remote from the at least one perforation at the first position and is adapted to be positioned adjacent the at least one perforation at the second position. A tensioning device is adapted to sufficiently tension the web against the at least one breaking member such that the at least one perforation is broken. A system and method for breaking a perforation of a moving web is also provided.

28 Claims, 6 Drawing Sheets

U.S. PATENT DOCUMENTS

| | | | |
|---|---|---|---|
| 4,675,015 | A | 6/1987 | Brown |
| 4,681,580 | A | 7/1987 | Reising et al. |
| 4,687,477 | A | 8/1987 | Suzuki et al. |
| 4,699,622 | A | 10/1987 | Toussant et al. |
| 4,770,656 | A | 9/1988 | Proxmire et al. |
| 4,771,483 | A | 9/1988 | Hooreman et al. |
| 4,785,696 | A | 11/1988 | Martiny |
| 4,842,596 | A | 6/1989 | Kielpikowski et al. |
| 4,850,988 | A | 7/1989 | Aledo et al. |
| 4,850,992 | A | 7/1989 | Amaral et al. |
| 4,886,632 | A | 12/1989 | Van Iten et al. |
| 4,940,464 | A | 7/1990 | Van Gompel et al. |
| 4,946,086 | A | 8/1990 | Suuronen et al. |
| 5,037,414 | A | 8/1991 | Booth |
| 5,074,854 | A | 12/1991 | Davis |
| 5,141,142 | A | 8/1992 | Ramsey |
| 5,340,424 | A | 8/1994 | Matsushita |
| 5,370,634 | A | 12/1994 | Ando et al. |
| 5,375,751 | A | 12/1994 | Makinen |
| 5,415,649 | A | 5/1995 | Watanabe et al. |
| 5,449,353 | A | 9/1995 | Watanabe et al. |
| 5,531,732 | A | 7/1996 | Wood |
| 5,562,964 | A | 10/1996 | Jones |
| 5,573,524 | A | 11/1996 | Sardo |
| 5,603,708 | A | 2/1997 | Seth |
| 5,704,566 | A | 1/1998 | Schutz et al. |
| 5,746,730 | A | 5/1998 | Suzuki et al. |
| 5,795,350 | A | 8/1998 | Schmitz |
| 5,820,617 | A | 10/1998 | Igaue et al. |
| 5,843,057 | A | 12/1998 | Mc Cormack |
| 5,855,574 | A | 1/1999 | Kling et al. |
| 5,858,515 | A | 1/1999 | Stokes et al. |
| 5,876,392 | A | 3/1999 | Hisada |
| 5,879,500 | A | 3/1999 | Herrin et al. |
| 5,881,622 | A | 3/1999 | Kaipf |
| 5,975,394 | A | 11/1999 | Shuval |
| 6,009,558 | A | 1/2000 | Rosch et al. |
| 6,027,484 | A | 2/2000 | Romare |
| 6,033,353 | A | 3/2000 | Lencoski et al. |
| 6,083,210 | A | 7/2000 | Young et al. |
| 6,110,157 | A | 8/2000 | Schmidt |
| 6,132,410 | A | 10/2000 | Van Gompel et al. |
| 6,160,200 | A | 12/2000 | Ehrnsperger et al. |
| 6,217,563 | B1 | 4/2001 | Van Gompel et al. |
| 6,264,641 | B1 | 7/2001 | Van Gompel et al. |
| 6,336,922 | B1 | 1/2002 | Van Gompel et al. |
| 6,361,527 | B1 | 3/2002 | Van Gompel et al. |
| 6,368,689 | B1 | 4/2002 | Sledge et al. |
| 6,375,646 | B1 | 4/2002 | Widlund et al. |
| 6,394,991 | B1 | 5/2002 | Takei et al. |
| 6,395,211 | B1 | 5/2002 | Dettmer et al. |
| 6,478,786 | B1 | 11/2002 | Glaug et al. |
| 6,508,797 | B1 | 1/2003 | Pozniak et al. |
| 6,523,595 | B1 * | 2/2003 | Milner et al. ............... 156/519 |
| 2002/0117528 | A1 | 8/2002 | Turek |
| 2003/0130641 | A1 * | 7/2003 | Richlen et al. ........ 604/385.01 |

FOREIGN PATENT DOCUMENTS

| | | | |
|---|---|---|---|
| EP | 0 187 728 | A2 | 7/1986 |
| EP | 0319314 | | 12/1988 |
| EP | 547497 | A2 | 6/1993 |
| EP | 0 570 980 | | 11/1993 |
| EP | 0 798 249 | A1 | 10/1997 |
| EP | 0844062 | A1 | 5/1998 |
| EP | 0757550 | B1 | 12/1998 |
| EP | 1 010 503 | A2 | 6/2000 |
| EP | 0 907 510 | B1 | 3/2002 |
| GB | 2267024 | A | 11/1993 |
| JP | 03176053 | | 7/1991 |
| JP | 3-205053 | | 9/1991 |
| JP | 10-315339 | A | 12/1998 |
| WO | WO 89 07897 | A1 | 9/1989 |
| WO | WO 96/11656 | | 4/1996 |
| WO | WO 97/45333 | | 12/1997 |
| WO | WO 98/43573 | | 10/1998 |
| WO | WO 98/55292 | | 12/1998 |
| WO | WO 98/56328 | | 12/1998 |
| WO | WO 00/00119 | | 1/2000 |
| WO | WO 00 20208 | | 4/2000 |
| WO | WO 200166452 | A1 * | 9/2001 |

OTHER PUBLICATIONS

International Search Report in corresponding International Appl. No. PCT/US03/18172, dated Oct. 24, 2003, 8 pages.
Copy of U.S. Appl. No. 10/034,994 filed Dec. 28, 2001, entitled “Method and Apparatus for Weakening a Portion of a Web”, Mlinar et al.
Copy of U.S. Appl. No. 10/032,701 filed Dec. 28, 2001 entitled “Absorbent Garment Having a Weakened Region”, Richlen et al.
International Search Report in corresponding PCT Appl. No. PCT/US02/39575, dated Jul. 1, 2003, 4 pages.
Derwent Abstract for SE 9601688A.

* cited by examiner

METHOD AND SYSTEM FOR BREAKING A WEB PERFORATION

BACKGROUND

The present invention relates to a method and system for breaking a web perforation.

Many types of consumer goods are manufactured on a continuous basis on large scale manufacturing lines. Often, various raw products or components are formed on, or integrated into a continuous stream of material, which often includes a web of material that moves in a machine direction through and along the line. As such, it is important to maintain the integrity of the stream of material or web and minimize breaks thereof. At the same time, it is often desirable to break the stream of material or web, such as paper towels or toilet paper, downstream to form discrete products or goods. For example, the steam of material may be weakened and then broken downstream, for example by accelerating the web on one side of the weakened region. Such methods and apparatus, however, typically require complex and expensive components to effect the timely acceleration and deceleration of the web.

One type of product typically made from a continuous stream of material is disposable undergarments. Disposable undergarments typically are made from a continuous stream of material that is successively broken or cut to form a plurality of discrete products or goods, which are then acted on individually or collectively. Undergarments, and in particular absorbent garments, can be configured in many different forms. For example, absorbent garments can be configured as a pant-type, pull-on garment, or as a diaper-type product that is drawn up between the legs and fastened about the waist with various fastening systems. Some consumers prefer a pull-on type garment, since the garment is applied to the user like conventional underwear. At the same time, consumers may desire a garment that can be refastened or adjusted to fit the user. Such duality can be difficult to achieve during the manufacturing process, however, since at least one portion of the web of a refastenable garment typically is severed to provide an open product from front to back, while a pull-up type garment typically requires the front and back to be connected.

Therefore, there remains a need for improved methods of and systems for breaking a perforation on a moving web. In addition, there remains a need for manufacturing various types of undergarments, and in particular a pant-type undergarment that is refastenable.

SUMMARY

Briefly stated, in one preferred embodiment, an apparatus for breaking a perforation of a moving web includes a web conveyor adapted to move a web in a machine direction, wherein the web has at least one perforation, and at least one breaking member moveable between a first position and a second position. The at least one breaking member is adapted to be positioned remote from the at least one perforation at the first position and is adapted to be positioned adjacent the at least one perforation at the second position. A tensioning device is adapted to sufficiently tension the web against the at least one breaking member such that the at least one perforation is broken.

In another aspect, a method for breaking a perforation formed in a moving web includes moving a web having at least one perforation in a machine direction and moving at least one breaking member between a first position remote from the at least one perforation and a second position adjacent the at least one perforation. The method further includes applying a tensioning force to the web and thereby breaking the at least one perforation with the at least one breaking member. In one preferred embodiment, the method further includes applying a fastener member onto the web, preferably across the at least one perforation.

The apparatus and method provide a simple and convenient way to break a web at a perforation. In one exemplary embodiment, the system and method are particularly well suited to manufacture a pant-type garment that can be refastened as an open diaper-type product. In particular, a fastener member can be secured across a perforation to maintain the integrity of the web as it is pulled through the manufacturing process. At the same time, the perforation can be broken beneath the fastener so as to provide for a garment that is refastenable.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE PRESENTLY PREFERRED EMBODIMENTS

Figure 6:
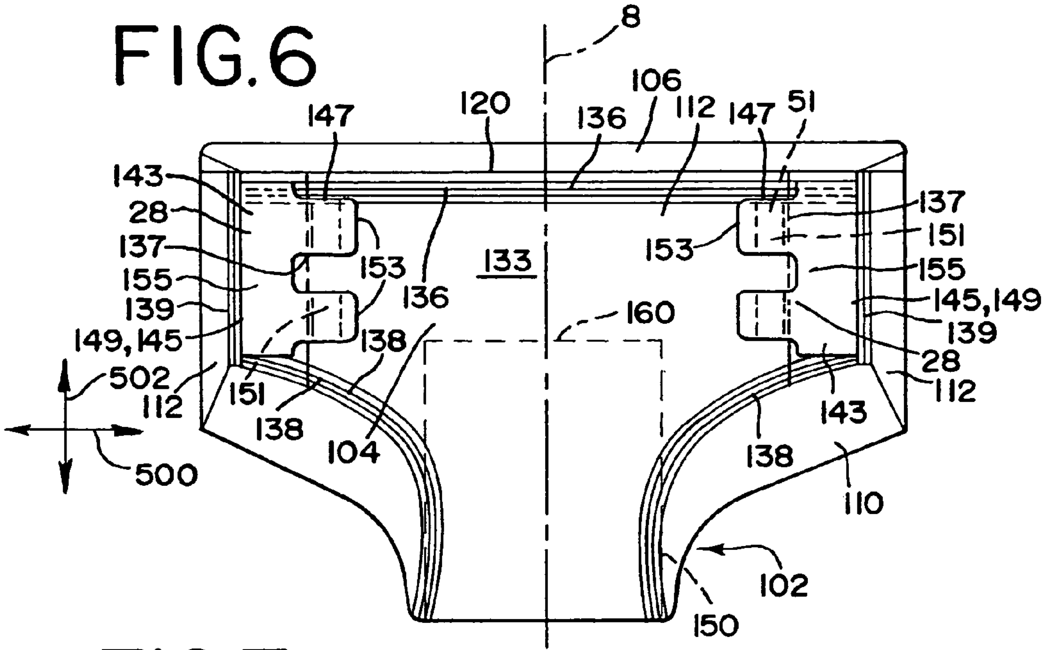
FIG. 6 is a plan view of one preferred embodiment of an absorbent garment in an unfolded configuration.
Figure 7:
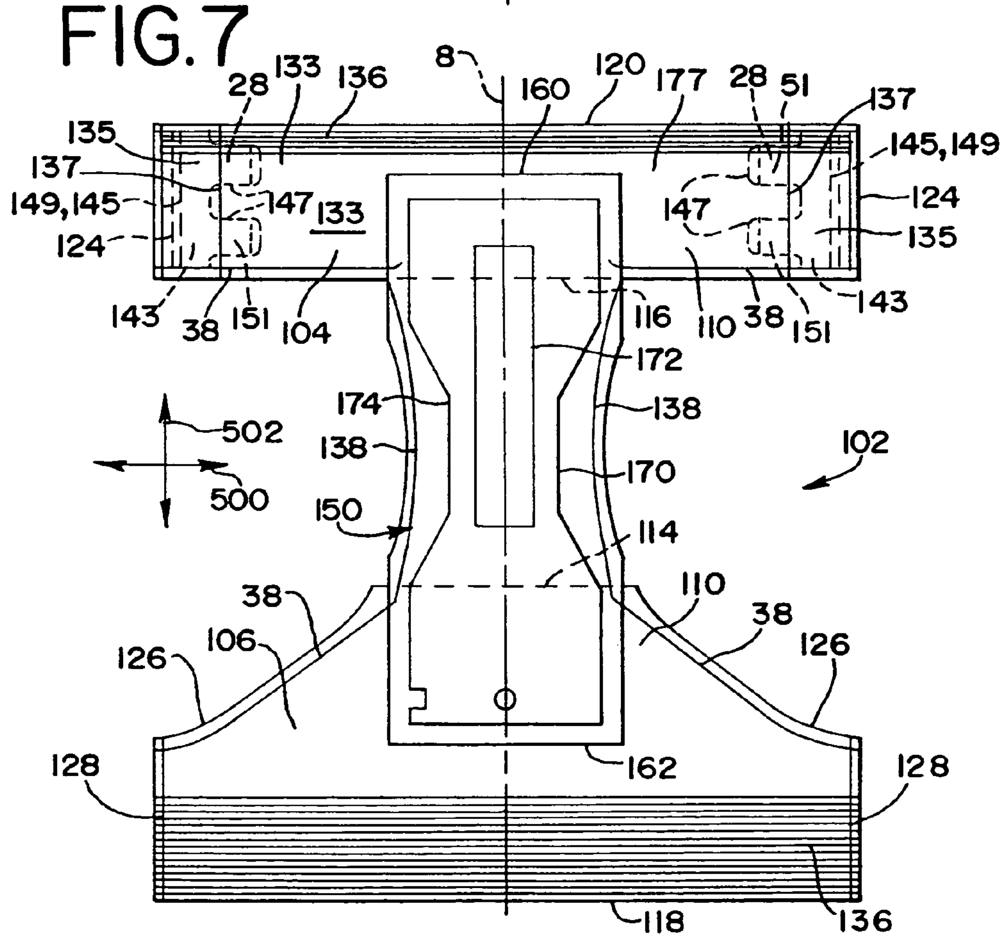
FIG. 7 is a front perspective view of one preferred embodiment of an absorbent garment in a folded configuration.

Referring to FIGS. 6 and 7, it should be understood that the term “longitudinal,” as used herein, means of or relating to length or the lengthwise direction 502, and in particular, the direction running between the front and back of the user. The term “laterally,” as used herein means situated on, directed toward or running from side to side, and in particular, a direction 500 running from the left to the right of a user, and vice versa. The terms “upper,” “lower,” “inner,” and “outer” as used herein are intended to indicate the direction relative to the user wearing an absorbent garment over the crotch region, while the terms “inboard” and “outboard” refer to the directions relative to a centerline 8 of the garment. For example, the terms “inner” and “upper” refer to a “body side,” which means the side closest to the body of the user, while the terms “outer” and “lower” refer to a “garment side.”

The term “body side” should not be interpreted to mean in contact with the body of the user, but rather simply means the side that would face toward the body of the user when the garment is applied to the user, regardless of whether the absorbent garment is actually being worn by the user and regardless of whether there are or may be intervening layers between the component and the body of the user. Likewise, the term "garment side" should not be interpreted to mean in contact with the garments of the user, but rather simply means the side that faces away from the body of the user when the garment is applied to the user, and therefore toward any outer garments that may be worn by the user, regardless of whether the absorbent garment is actually being worn by a user, regardless of whether any such outer garments are actually worn and regardless of whether there may be intervening layers between the component and any outer garment.

The term "machine direction" means the direction of flow as the various members and webs progress along the fabrication line and process. It should be understood that various separate members or webs can each be traveling in a machine direction, but with the various machine directions not necessarily being parallel or oriented in the same direction. For example, one web may be traveling along a first machine direction, which is substantially perpendicular to the travel of another web in a second machine direction.

The term "cross-machine direction" means the direction substantially perpendicular to the machine direction.

The term "downstream" means that one item is positioned more closely to the output or finished product end of the machine and/or process relative to another item. Conversely, the term "upstream" means that an item is positioned more closely to the input end of the machine or process relative to another item. For example, the output end is downstream of the input end, and vice versa, the input end is upstream of the output end.

The phrases "removeably attached," "removeably attaching," "removeably connected," "removeably engaged," "releasably attached," "releasably connected," or "releasably engaged," and variations thereof, refers to two or more elements being connected or connectable such that the elements tend to remain connected absent a separation force applied to one, both or all of the elements, and where the elements are capable of being separated upon the application of a separation force. The required separation force is typically beyond that encountered while wearing the absorbent garment.

The phrases "fixedly secured," "fixedly engaged," "fixedly attached," "fixedly connected," and variations thereof, refers to two or more elements being connected or connectable such that they are not disconnected or otherwise separated, and are not intended to be separated or disconnected, during the normal operation and use of the absorbent garment.

The term "web" refers to a continuous stream of material, whether made from one or more layers or substrates, or of one or more connected in-line pieces, and regardless of whether it may have non-continuous, discrete items disposed thereon, or is made up of connected non-continuous, discrete items. For example, and without limitation, a web includes various paper products, tissue, including toilet paper and facial tissue, paper towels, cardboard, plastic, such as plastic wraps or bags, films, various components and assemblies of absorbent garments, including for example body panels, etc., which may be comprised of nonwoven materials, such as spunbond materials, woven materials, multi-directional elastic materials, and various combinations thereof.

The term "weakening" means to cause to lose strength, such that the area that is weakened is not as strong as the adjacent areas. For example, and without limitation, an area that is weakened may have a lesser tear or tensile strength as compared with the adjacent areas of the web, such that the web is more likely to be torn or broken along the area of weakness rather than the adjacent areas. In this way, the manufacturer can control the area of the web that will be broken, whether such breakage is performed by the end user or at a later time during the manufacturing or fabrication process.

The term "perforation" refers to any line of weakness, i.e., a region or area of weakened material, preferably having a length and which may or may not have a defined width, and can include linear and non-linear patterns, such as curvilinear patterns of weakness, or other shapes, such as a circles, rectangles, etc. The perforation can include a series of cuts, a thinning, or breakage or separation of material, or a strip of a different kind of material bridging between adjacent portions of material, that is more easily torn or broken than the adjacent portions, and which allow the user or manufacturer to separate the adjacent portions along the line of weakness.

The term "undergarment" refers to a garment worn next to the body, regardless of whether additional garments are worn on top thereof. Accordingly, and for example without limitation, a diaper is an undergarment, even if worn only by itself.

Figure 1:
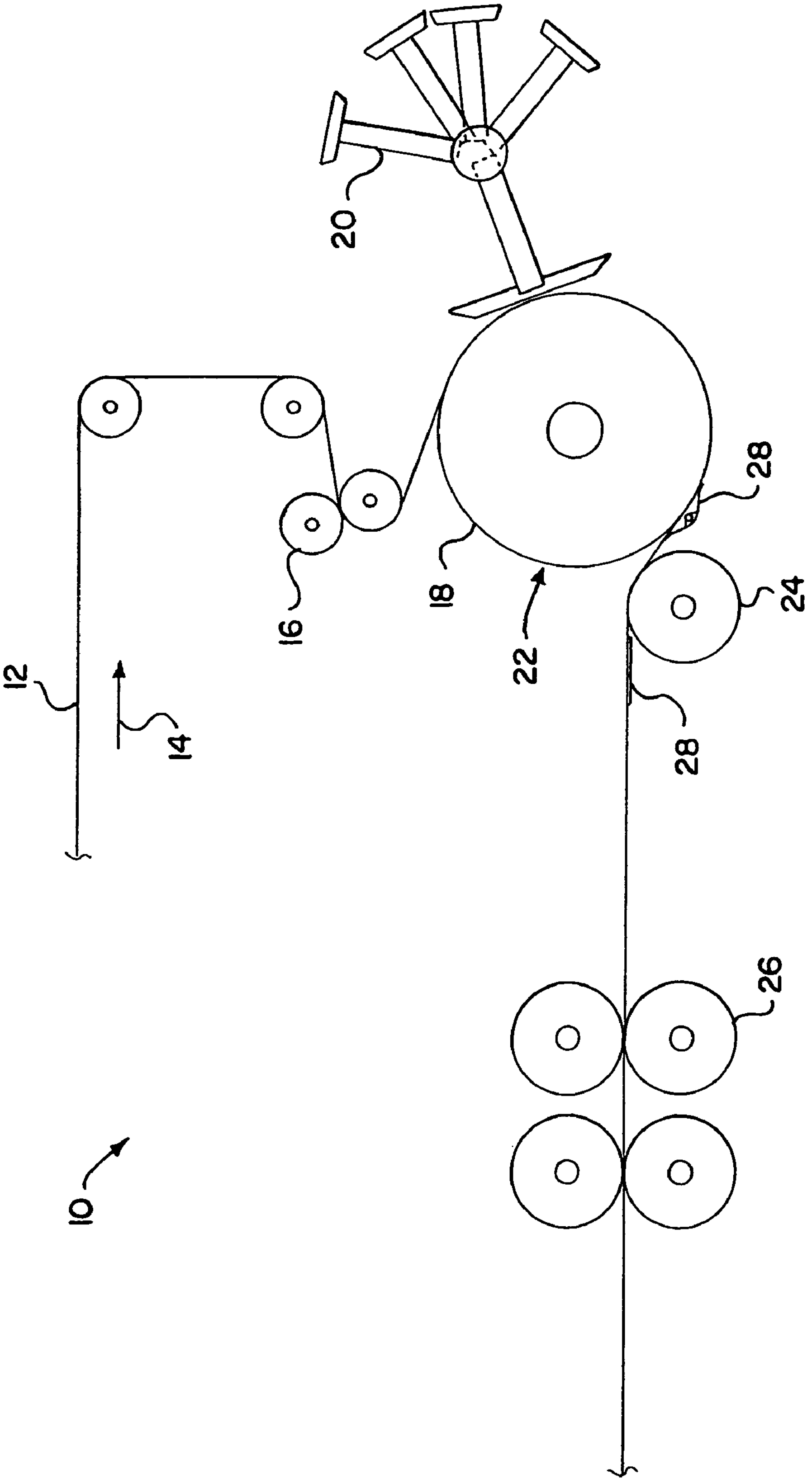
FIG. 1 is a schematic representation of a method of and apparatus and system for breaking a perforation on a moving web.

Referring now to FIG. 1, a system for breaking a web perforation according to the present invention is shown generally at 10. The system 10 includes a plurality of web conveyors, such as conventional rollers or rotary drums, for moving a continuous web 12 in a machine direction indicated generally by arrow 14. The system 10 also includes a perforator 16, a web conveyor defining a fastener application drum 18, a fastener applicator 20, one or more perforation breaking members 22, a web conveyor defining a tensioning device 24, and a calendaring device 26. The perforator 16 is adapted to weaken or perforate the web 12 in a generally cross-machine direction. Examples of suitable perforators 16 are disclosed in commonly-assigned copending U.S. App. Ser. No. 10/034,994, entitled "Method And Apparatus For Weakening A Portion Of A Web", filed on Dec. 28, 2001, now U.S. Pat. No. 6,838,040, and U.S. application Ser. No. 10/032,701, entitled "Absorbent Garment Having A Weakened Region," filed Dec. 28, 2001, both of which are incorporated herein by reference in their entireties.

The fastener application drum 18 provides support for the web 12 while the fastener applicator 20 places discrete parts, such as fasteners 28, onto the web 12. The fastener applicator is preferably configured as an offset cam action rotator. Examples of suitable fastener applicators are disclosed in commonly assigned copending U.S. application Ser. No. 10/038,766, entitled "Apparatus For Applying Discrete Parts To A Moving Web", filed on Jan. 2, 2002, and in U.S. Pat. Nos. 5,716,478, 5,759,340 and 6,139,004, all of which are incorporated by reference in their entireties. Alternatively, the subassembly can be rotated using a revolving transfer roll as shown and described in U.S. Pat. No. 4,608,115, which is assigned to Kimberly-Clark Worldwide, Inc., the assignee of the present application, and which is hereby incorporated herein by reference in its entirety.

Figure 2:
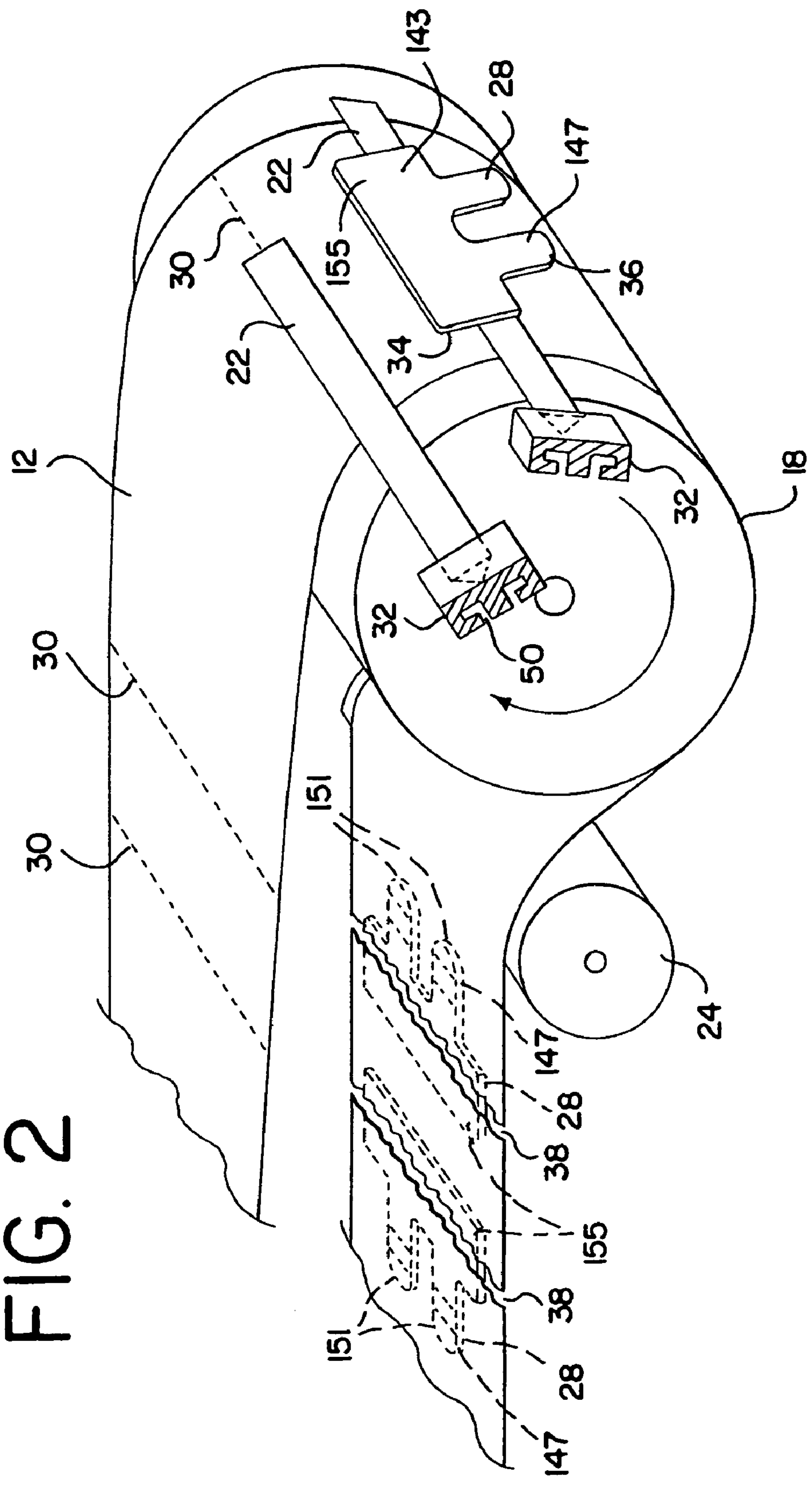
FIG. 2 is partial perspective view of an apparatus and system for breaking a perforation on a moving web.

In on exemplary embodiment, a pair of fasteners 28 are applied simultaneously to the web 12 with the fastener applicator 20 across a pair of perforation lines 30. As shown in FIG. 2, the fasteners 28 have tabs 147 facing in opposite directions and are spaced in the machine direction. Ultimately each of the fasteners in each pair are associated with different discrete products, for example absorbent garments, after the web is separated, for example by cutting, between the pair of fasteners 28 to form the discrete products.

As will be more fully described below, the breaking member 22 cooperates with the tensioning device 24 to break or tear the perforations formed in the web 12 by the perforator 16. The calendaring device 26 acts to secure the fasteners 28, which preferably have adhesive applied to at least one end thereof and a mechanical or other type of fastener on the other end thereof, unto the web 12. The fasteners 28 may include those known in the art, such as hook-and-loop type fasteners. Examples of suitable fasteners are disclosed in U.S. application Ser. No. 10/032,701.

As best shown in FIG. 2, the perforation breaking members 22 are positioned and arranged to be moveable over a line of perforation 30 in a generally cross-machine direction. As the web 12 having the perforations 30 contacts the fastener application drum 18, the breaking members 22 are individually moved in the cross-machine direction by respective reciprocating members 32 from a first position remote from the perforations 30 and the web 12, to a second position adjacent to the web 12 and extending the full length of the line of perforations 30. The breaking members 22 do not overlie any portion of the web 12 when in the first position such that a first surface of the web 12 can be applied to the fastener application drum 18. After the web 12 is applied to and supported by the drum 18, one or more breaking arms 22 move simultaneously or successively, in the cross-machine direction over a second surface of the web 12, with the web 12 disposed between the breaking members 22 and the drum 18. The breaking member(s) 22 move such that it/they overlie(s) the entirety of the web 12, which in one exemplary embodiment is formed as a front body panel of an absorbent garment having a length of between about 6 inches and about 7 inches.

In the embodiment shown, the breaking members 22 are formed with a triangular cross-section, with an apex facing the outer surface of the web 12 and in particular the perforation line 30. The sharpness of the apex can improve the ease of breaking the perforation, although a duller or curved apex will also work. Moreover, those skilled in the art will recognize that other shapes and arrangements may also be useful in providing a breaking member according to the present invention. For example, a simple rectangular bar is suitable for breaking the perforation. The breaking member is preferably made of a rigid, non-flexible material, such as hardened or stainless steel. The portion of the breaking member that overlies the perforation will have a minimal thickness, preferably adjacent the web. For example, in one embodiment, the thickness of the member at the point closest to the web is between about 0.001 inches and about 0.750 inches, and more preferably between about 0.005 inches and about 0.150 inches. If triangular, the base of the breaking member has a base or width of between about 0.005 inches and about 1.00 inches, but can extend up to three inches. As the width of the breaking member increases, there is a corresponding lesser amount of attachment between the fastener and the web on each side of the perforation. At the same time, the breaking member 22 must have a cross sectional area sufficient to avoid excessive deflection thereof as it is pulled through the web 12.

Figure 3:
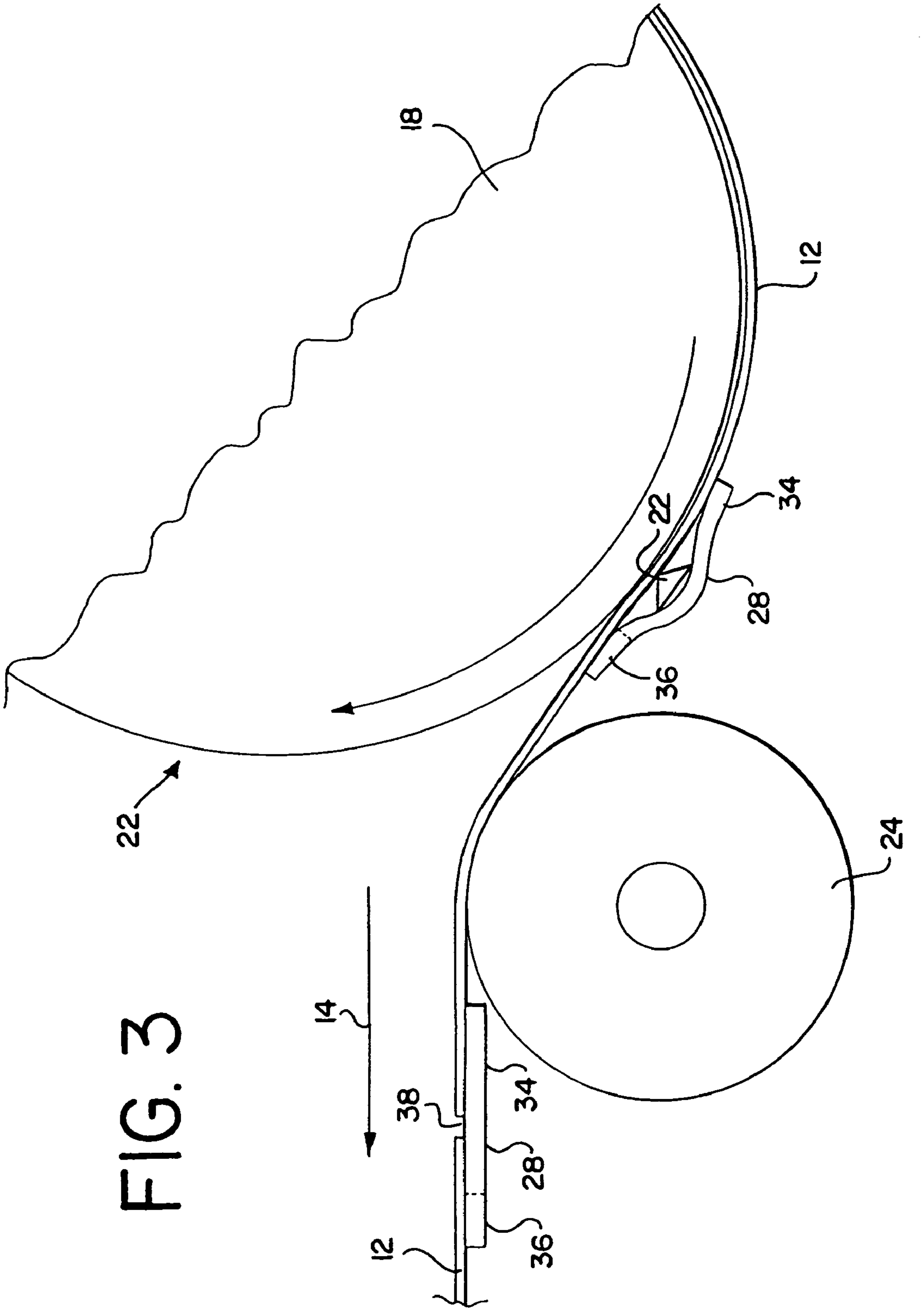
FIG. 3 a partial side view of the apparatus and system shown in FIG. 1.

Referring to FIGS. 1 and 3, the fasteners 28 are applied to the web 12 by the fastener applicator 20 over the breaking members 22 such that first and second ends 34, 36 of the fasteners 28 contact and are connected to the web 12 on either said of the respective breaking member 22. After the line of perforations 30 are broken, the fasteners 28 will serve to hold together the portions of the web divided by gaps 38. In a preferred embodiment, one of the ends 34 of the fastener 24 is fixedly secured to the web 12 with an adhesive, while the other end 36 thereof is secured to the web 12 with a releasable component, such as a mechanical fastener or an adhesive. Of course, both ends of the fastener can be either fixedly or releasably connected to the web.

Turning now to FIG. 3, the breaking members 22 continue to rotate with the fastener application drum 18 as the web 12 is pulled away from the drum 18 by the tension device 24. The tension device 24 is adapted to sufficiently tension web 12 against the breaking members such that the perforation is broken or torn as the web 12 continues towards the tension device 24 and the breaking members continue to rotate with fastener application drum 18 through the web 12, generally in a "Z" direction. Preferably, the strength of the perforation 30 must be less than the fastener engagement strength on each side thereof, such that the perforation 30 breaks rather than the fastener 24 releasing from the web 12 on either side of the perforation. The calendaring device 26 further secures the fasteners 25 to the web 12. The web 12 is then held together for the remainder of the manufacturing process by the fasteners 24.

Figure 4:
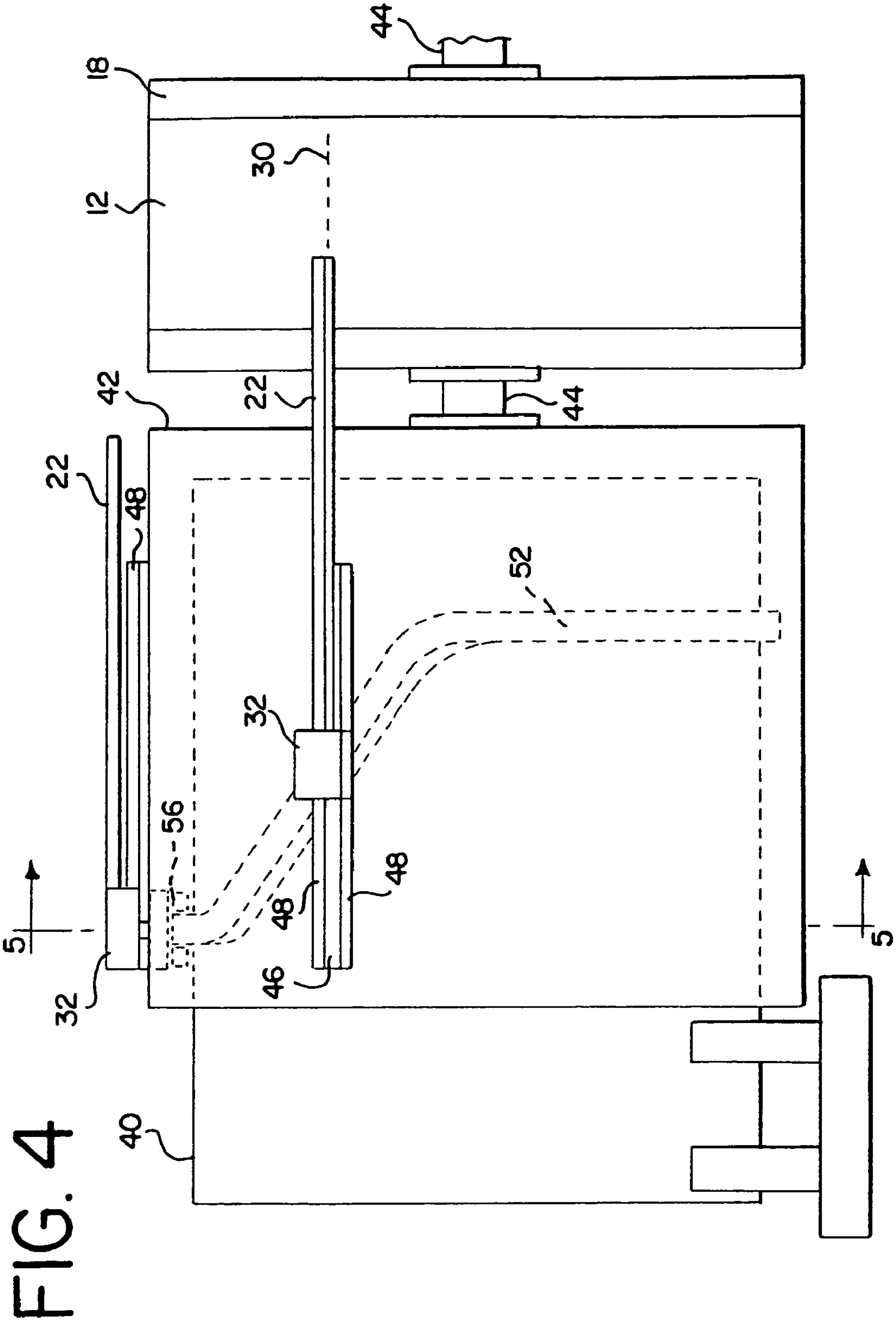
FIG. 4 is a front view of the apparatus and system shown in FIG. 1.
Figure 5:
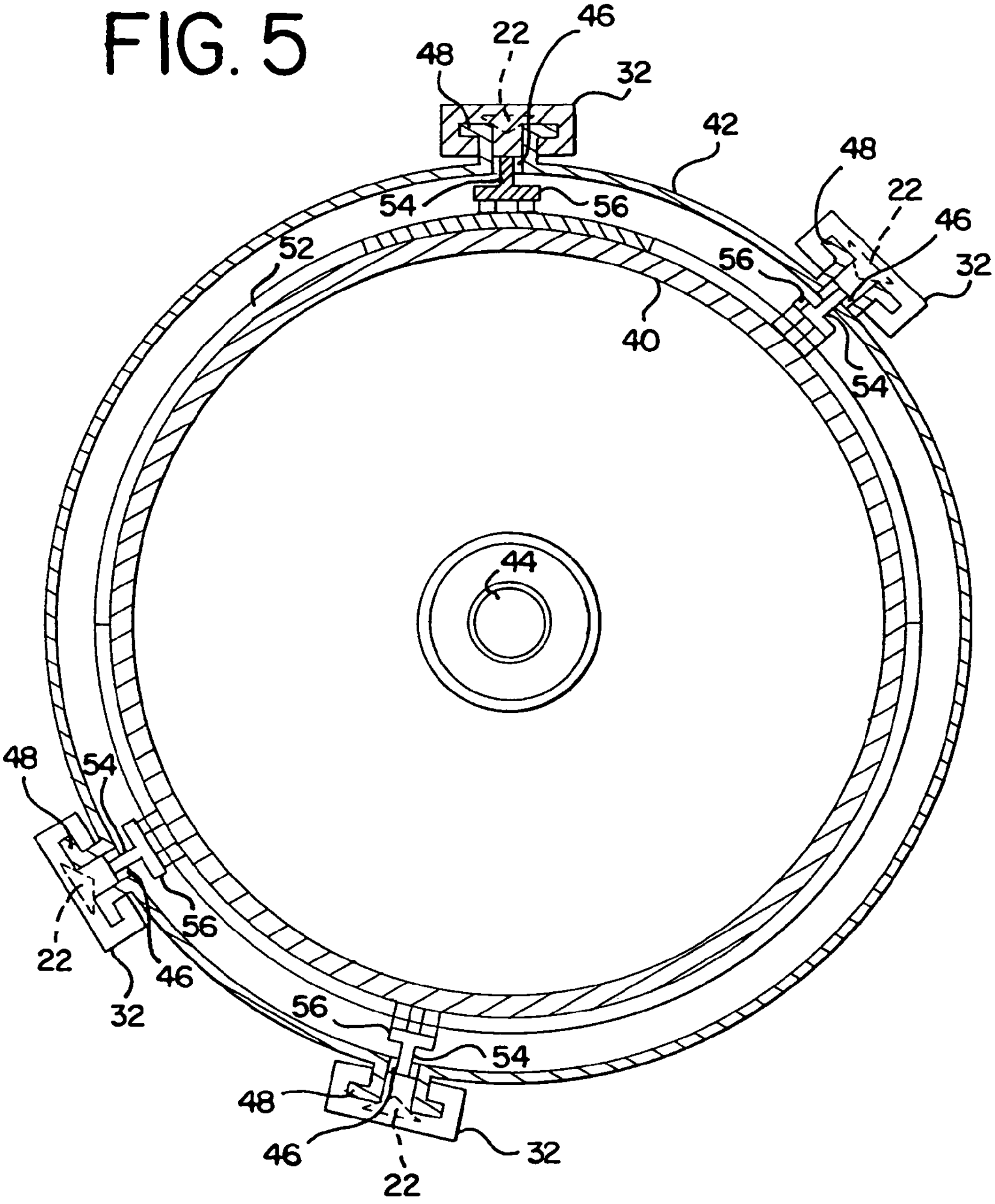
FIG. 5 is a cross-sectional view of the apparatus and system taken along line 4—4 of FIG. 4.

FIGS. 4 and 5 illustrate one embodiment of a device for moving the perforation breaking members 22 to their first position remote from the web 12 and line of perforations 30 and their second position adjacent the web 12 and overlying the line of perforations 30. The device includes a first stationary support defined as a stationary drum 40, and a second support defined by a rotating drum 42. The rotating drum 42 is connected with the web conveyor 18 via a common drive member 44. The drive member 44 is rotated by a motor (not shown) or other conventional power device. The rotating drum 42 includes one or more apertures 46 elongated in a generally cross-machine direction that is parallel to the line of perforations 30. The apertures 46 are bordered on either side by an elongated inverse "L"-shaped flange 48. Reciprocating members 32 include a pair of passages 50 configured to allow the reciprocating members 32 to slide along elongated inverse "L"-shaped flanges 48.

The stationary drum 40 includes a cam track 52. Each reciprocating member 32 is attached by a rotary shaft 54 to a cam follower 56 which moves along the cam track 52. The cam track 52 is configured to force the movement of the reciprocating member 32 and thus the breaking members 22 back and forth between the first and second positions in the generally cross-machine direction at the appropriate times throughout the process. In an alternative embodiment (not shown), the applicator drum may include a receiving track formed on the opposite side of the web. In such an embodiment, the free end of the breaking member is releasably supported by a support member that rides in the receiving track. In this way, the breaking arm is supported on both ends, such that it can be made thinner or with a smaller cross section, and/or such that the deflection thereof can be reduced or substantially eliminated.

FIGS. 6 and 7 show one embodiment of an absorbent garment 102 that can be manufactured using the apparatus and method disclosed herein. The absorbent garment 102 includes a first, front body panel 104 and a second, rear body panel 106. The term "body panel" refers to the portion(s) of the absorbent garment, whether made of one or more layers or substrates or of one or more pieces or components, that is/are fitted circumferentially around at least the waist region of the user, including for example the user's lower back, buttock, hips and abdomen. Other shapes and forms of the body panels are shown and disclosed in U.S. patent application Ser. No. 10/261,805, filed Oct. 1, 2002, and entitled THREE PIECE DISPOSABLE UNDERGARMENT AND METHOD FOR THE MANUFACTURE THEREOF, which application is hereby incorporated herein in its entirety. Therefore, for example, the body panels can be made of separate discrete members, or they can form part of a one-piece body chassis that further includes a crotch portion.

The first and second body panels each have an inner, bodyside surface 110 and an outer, garment side surface 112. The first, front body panel 104 has a length, which is measured between opposed first and second terminal edges 116 and 120, and which is less than the overall length of the absorbent garment. Likewise, the second, rear body panel 106 has an overall length, which is measured between opposed first and second terminal edges 114 and 118, and which is also less than the overall length of the absorbent garment. Each of the first and second body panels has an outboard edge 124, 128 formed along the outer periphery of laterally opposed side portions of the first and second body panel. It should be understood that the outboard edges of the front and rear body panels can be the same or different lengths.

In one embodiment, shown in FIG. 6, the second body panel includes a tapered edge 126 on each side thereof that forms in part the leg opening, along with the side edges of an absorbent composite 150 and the terminal edge 116 of the first body panel. It should be understood that the first body panel also could be configured with tapered side edges, as shown for example in FIG. 7.

Referring to FIGS. 6 and 7, one or more, and preferably a plurality, meaning two or more, laterally extending elastic elements 136 are secured to each of the first and second body panels. Preferably, a plurality of laterally extending elastic elements are longitudinally spaced across substantially the entire length of the waist portion of the rear body panel 106, although they may be spaced across a lesser length. Leg elastic elements 138 can also be incorporated along the edges of the body panels and crotch member, or absorbent composite, to provide a conforming fit to the user's legs.

In one embodiment, shown in FIG. 6, the front body panel has a "non-elasticized" area 177 wherein there are no laterally extending elastic elements, or other elastic or elastomeric backing members, incorporated therein or making up any portion of the thickness or cross-section of the body panel at that area, which would gather the material. For example elastic elements can extend along the upper waist portion and along the lower terminal edge defining the leg opening. It should be understood, that in an alternative embodiment, one or more separate waist bands, with or without elastic elements, can be secured to one or both of the rear and front body panels, preferably along the upper terminal edges thereof. Similarly, separate leg bands can be secured along the edges of the body panels and absorbent composite that define the leg openings. Alternatively, one or both of the body panels can be formed without any elastic elements, of the entirety of the panels can be elasticized.

Each body panel 104, 106 is preferably formed as a composite, or laminate material, otherwise referred to as substrates or laminates, with the elastic element(s) sandwiched therebetween. Preferably two or more layers are bonded with various adhesives, such as hot melt, or by other techniques, including for example and without limitation ultrasonic bonding and heat pressure sealing. In one embodiment, the two layers are made of a nonwoven material. It should be understood that the body panels can be made of a single layer or substrate of nonwoven material, or can be comprised of more than two layers or substrates. Of course, it should be understood that other knitted or woven fabrics, nonwoven fabrics, elastomeric materials, polymer films, laminates and the like can be used to form one or more of the body panel layers. The term "nonwoven" web or material, as used herein, means a web having a structure of individual fibers or filaments that are interlaid, but not in an identifiable manner and without the aid of textile weaving or knitting, as in a knitted or woven fabric. In one embodiment, the nonwoven layers or substrates can be made by spunbonding.

In one alternative preferred embodiment, a landing material, which releasably engages the fastener members, can be secured to the body panel. One exemplary landing material is made of the point-unbonded nonwoven material, for example, a 2.0 osy point-unbonded material. One exemplary material of this type has been used in a HUGGIES® Ultratrim Disposable Diaper, which is commercially available from Kimberly-Clark Corporation. In another preferred embodiment, the landing material, which can be comprised of a portion of one of the body panel substrates, e.g., a body panel liner, is made of a nonwoven material, for example, a spunbond material having a basis weight of preferably about 0.6 osy. In other preferred embodiments, the basis weight of each substrate can be between at least about 0.3 and about 2.0 osy, and preferably between about 0.5 osy and about 1.5 osy, and more preferably between about 0.5 osy and about 1.0 osy. Even with a relatively low percent area bonding, the relatively low basis weight nonwoven material exhibits strength and tear characteristics allowing it to be used as a body panel. Other materials that may be used as the nonwoven material include various meltblown materials, and also bonded-carded materials.

In other alternative embodiments, the landing material can be made of a loop material, which typically includes a backing structure and a plurality of loop members extending upwardly therefrom. The loop material can be formed from any suitable material, such as acrylic, nylon or polyester, and can be formed by such methods as warp knitting, stitch bonding or needle punching. Suitable loop materials are available from Guilford Mills, Inc., Greensboro, N.C., U.S.A. under the trade designation No. 36549.

The body panel 104, 106 nonwoven material is preferably substantially hydrophobic, which may optionally be treated with a surfactant or otherwise process to impart a desired level of wettability and hydrophilicity. In one particular embodiment of the invention, the body panel is a nonwoven, wire-weave spunbond polypropylene fabric composed of about 1.6 denier fibers formed into a web having a basis weight of about 0.6 osy. One suitable nonwoven material is the Corinth 0.60 osy, 1.6 dpf wireweave, nonwettable Metallocene (EXXON ACHIEVE 2854 PP) spunbond material manufactured by Kimberly-Clark Corporation, the assignee of the present application.

Referring to FIGS. 6 and 7, fastening members 28 are preferably attached to the garment side surface of the front body panel and extend laterally inboard relative to the outboard side edge 124 of the front body panel 104 from an attachment location 145. Opposite longitudinally extending separation lines 137 separate a middle portion 133 from the opposite side portions 135. As explained above, the lines of separation 137, shown in FIGS. 6 and 7, are formed by breaking the perforation lines 30 in the web 12 as shown in FIGS. 2 and 3. The web 12, which preferably forms the front body panels 104 is bonded to another web, which preferably forms the rear body panels 106 to form a side seam 139, and the two webs are then cut along the bond.

Preferably, the fastening members 28 are secured to the garment-side surface 112 of the side portions 135 between the side edge 124 of the front body panel and the line of separation 137. It should be understood that, in other embodiments, the fastening members can be secured to the rear body panel and engage the front body panel or, conversely, can be secured to the front body panel and engage the rear body panel. For example, in one preferred embodiment, the fastening members can be secured to the rear body panel and can include a portion crossing over a line of separation formed along the front body panel, or alternatively along the rear body panel, and can refastenably engage a portion of the front body panel on the other side of the line of separation. Preferably, the fastening members are fixedly secured to the outer, garment-side surface of the front and/or rear body panels, and releasably engage the outer, garment-side surface of the front and/or rear body panels, although it should be understood that the fastening members could be fixedly secured to an inner, body-side surface of front and/or rear body panels and releasably engage an inner, body-side surface of the front and/or rear body panels.

Referring to the preferred embodiments of FIGS. 6 and 7, the middle portion 133 preferably does not include a separate landing member secured thereto. Instead, the front body panel itself serves as a landing material. However, a landing member can be secured to the middle portion for releasably engaging the fastener members.

The opposite side edges 124 of the front body panel 104, which are formed from web 12, are joined to the opposite side edges 128 of the rear body panel 106 to form a seam 139, as explained above. The seam 139 is formed by bonding, sewing or otherwise attaching the side edges. For example, in one preferred embodiment, the side seams are formed by ultrasonic bonds. In this way, the absorbent garment is be configured as a pant-like garment, which can be pulled over the legs of the user, as the fasteners 28 join the panel components 104, 106 across the lines of separation 137. After the garment is applied to the user, the fasteners 28 can be released and the body panels 104, 106 can be adjusted to fit the garment to the user. By providing the side portions 135, and by connecting the fasteners 28 to the front body panel 104, instead of the rear body panel, the fasteners 28 are located at the front of the user so as to not provide discomfort to the user when lying on their backs and to allow the fasteners to be more easily seen and adjusted by the user or caretaker.

As shown in FIGS. 2, 6 and 7, the fasteners 28 comprise a carrier member 143 that is formed in a generally sideways, "U" shape, with a vertical extending base member 155 forming the first end 34 and a pair of laterally extending and longitudinally spaced tab members 147 forming the second end 36, which cross the perforation line 30, and subsequently after breaking the perforation line, the line of separation 137. The carrier member can include a single tab member, or more than two tab members. In various embodiment, the carrier members are fixedly secured to the web 12, which defines the side portions of the front body panel 104, with adhesive bonds 149, sonic bonds, thermal bonds, pinning, stitching or other known types of attachment. In alternative embodiments, the fastening members can be fixedly secured to the rear body panel, or to one or both of the front and rear body panels, e.g., at the seam.

In one exemplary embodiment, the pair of fastener members 28 used to releasably secure the front and rear body panels define a "fastening system," which refers to the grouping of fastener members used to releasably secure two or more portions of an absorbent garment. Although the fastening system is shown as being configured with two fastener members, it should be understood that it could include additional fastener members, and that the two-fastener member fastening system shown in the Figures is meant to be illustrative rather than limiting. For example, the fastening system could include three, four or even more fastener members.

Referring to FIGS. 1–3, 6 and 7, the fasteners 28, and in particular the carrier members 143, are fixedly connected to the front body panel base web 12, and after separation, the front body panel 104. The tab members 147 can be oriented toward each other on either of the front and rear body panels, or away from each other, as shown in FIG. 2.

Each carrier member 143 has a longitudinal length and each of the tab members 147 comprises a refastenable portion 151 or an engagement portion having a longitudinal length. The refastenable portion 151 preferably comprises an array of hooks, as explained below, but alternatively can comprise various adhesives, such as pressure sensitive adhesives, buttons, zippers, snaps and other releasable and reattachable fastening devices known to those skilled in the art.

In one preferred embodiment, the refastenable portion 151 comprises a hook-type fastener member, or hook strip, which is secured to the carrier member 143 with adhesive, ultrasonic bonding, stitching or other known attachment devices. The end portion 153 or tip of the carrier member can be left uncovered by the refastenable portion 151, such that it can be lifted or flexed and grasped by a user as they disengage or peel back the fastener member. It should be understood that the term "hook" as used herein means any element capable of engaging another element, and is not intended to limit the form of the engaging elements, for example to include only "hooks," but rather encompasses any form or shape of engaging element, whether unidirectional or bidirectional. Various hook configurations are described in U.S. Pat. No. 5,845,375 to Miller et al., U.S. Pat. No. 6,132,660 to Kampfer, U.S. Pat. No. 6,000,106 to Kampfer, U.S. Pat. No. 5,868,987 to Kampfer, U.S. Pat. No. 4,894,060 to Nestegard, and U.S. Pat. No. 6,190,594 B1 to Gorman, the entire disclosures of which are incorporated by reference herein. Some examples of hook fasteners are the various CS600 hook fasteners, including the XKH-01-002 CS600, 2300 Pin Density hook fastener (Part No. XKH-01-002/60MM/SP#2628), manufactured by Minnesota Mining and Manufacturing Co., St. Paul Minn. Other examples of hook fastener are the Velcro® HTH-851 and HTH-829 hook fasteners available from Velcro USA, Inc.

Referring to FIGS. 6 and 7, when the absorbent garment is secured to the user, the fasteners 28 secured to the side portions of the front body panels 104, or elsewhere as described above, releasably engage or are otherwise connected to the middle portion of the front body panel 104. In particular, the heads on the hooks engage the fibers of the body panel, whether elasticized or not, or alternatively the landing material making up the landing member. Referring to FIG. 2, the refastenable portions 151 are engaged with the web 12 to form a mechanical bond with the web 12 during the manufacturing process so as to help maintain the connection between the side and middle portions.

Referring to FIGS. 6 and 7, the absorbent garment includes an absorbent composite 150 having first and second longitudinally opposed terminal end edges 160, 162. The absorbent composite preferably includes a substantially liquid permeable topsheet, or liner, and a substantially liquid impermeable backsheet, or outer cover. A retention portion 170 is disposed or sandwiched between the topsheet and the backsheet, which are connected. The topsheet, backsheet and other components of the absorbent composite 150 can be joined for example with adhesive bonds, sonic bonds, thermal bonds, pinning, stitching or any other attachment techniques known in the art, as well as combinations thereof.

For example, a uniform continuous layer of adhesive, a patterned layer of adhesive, a sprayed pattern of adhesive or any array of lines, swirls or spots of construction bonds may be used to join the topsheet and backsheet, or any of the other components described herein. It should be understood that the term "absorbent composite" refers to any material or assembly capable of absorbing liquids or bodily exudates, and may be comprised of a single material or component, for example a retention portion.

Additional layers, including for example, a surge layer 172, are also preferably incorporated into the absorbent composite. Preferably, the surge layer does not run the entire length of the absorbent composite and is shorter than the retention portion. The topsheet can be indirectly joined to the backsheet by affixing the topsheet to intermediate layers, such as the surge layer or retention portion, which in turn is affixed to the backsheet. The absorbent composite may also include barrier cuffs, or leakage control shields, formed along the opposite longitudinally extending edges of the absorbent composite.

The retention portion 170 is preferably made of an absorbent material, which can be any material that tends to swell or expand as it absorbs exudates, including various liquids and/or fluids excreted or exuded by the user. For example, the absorbent material can be made of airformed, airlaid and/or wetlaid composites of fibers and high absorbency materials, referred to as superabsorbents. Superabsorbents typically are made of polyacrylic acids, such as FAVOR 880 available from Stockhausen, Inc. of Greensboro, N.C. The fibers can be fluff pulp materials, such as Alliance CR-1654, or any combination of crosslinked pulps, hardwood, softwood, and synthetic fibers. Airlaid and wetlaid structures typically include binding agents, which are used to stabilize the structure. In addition, various foams, absorbent films, and superabsorbent fabrics can be used as an absorbent material. Various acceptable absorbent materials are disclosed in U.S. Pat. No. 5,147,343 for Absorbent Products Containing Hydrogels With Ability To Swell Against Pressure, U.S. Pat. No. 5,601,542 for Absorbent Composite, and U.S. Pat. No. 5,651,862 for Wet Formed Absorbent Composite, all of which are hereby incorporated herein by reference. Furthermore, the proportion of high-absorbency particles can range from about 0 to about 100%, and the proportion of fibrous material from about 0 to about 100%. Additionally, high absorbency fibers can be used such as Oasis type 121 and type 122 superabsorbent fibers available from Technical Absorbent Ltd., Grimsby, Lincolnshire, United Kingdom.

The retention portion 170 has laterally opposed side edges 174 and preferably can be made of a single or dual layer of absorbent material. The retention portion preferably has an hour-glass shape with enlarged end regions. Alternatively, the retention portion can include a folded or multi-layered configuration. The retention portion preferably has a length substantially equal to, or slightly shorter than, the length of the absorbent composite. The retention portion can include one or more barrier layers attached to the absorbent material. In one embodiment, an upper tissue substrate is disposed adjacent the retention portion. Alternatively, a lower tissue substrate can be disposed adjacent an opposite side of the retention portion, or the tissue can completely envelope the retention position.

Referring to FIG. 6, the opposite garment side of the end regions of the absorbent composite, and in particular, the outer, garment side surface of the backsheet, are secured to the bodyside surface of the longitudinally opposed crotch ends of the first and second body panels 104, 106, and in particular the liner portion of those body panels. It should be understood that the absorbent composite can be secured using any of the methods of attachment described above, including for example various adhesives, stitching or other bonding methods. The absorbent composite can be secured to the body panels with any configuration of attachment lines, swirls, patterns, spots, etc., or can be a full and continuous attachment therebetween. It should be understood that the absorbent composite can be attached to the body side surface or garment side surface of the body panels.

It should be understood and appreciated that the system and method for breaking the perforation on a moving web 12 as disclosed herein can be applied to any web having a perforation 30 that is subsequently broken while one or more fasteners 28 or connectors hold the web 12 together across the perforation, and that the invention is not limited to the manufacture of the exemplary absorbent garment disclosed herein. In addition, in one embodiment, the connector bridging the perforation line can be configured as an elastic material, that is secured, fixedly or releasably, to the web of material on each side of the perforation. In such an embodiment, the connector material provides additional stretch to the web at a particular area or region of the web.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

The invention claimed is:

1. An apparatus for breaking a perforation of a moving web, comprising:

a web conveyor adapted to move a web in a machine direction, wherein said web has at least one perforation, and wherein said web conveyor comprises a first rotating drum rotatable about a rotation axis extending in a generally cross-machine direction;

at least one breaking member moveable between a first position and a second position, wherein the at least one breaking member is adapted to be positioned remote from the at least one perforation at the first position and is adapted to be positioned adjacent the at least one perforation at the second position, and wherein said at least one breaking member is rotatable about said rotation axis; and a tensioning device adapted to sufficiently tension the web against the at least one breaking member such that the at least one perforation is broken.

2. The apparatus of claim 1 wherein the at least one breaking member is moveable between the first position and the second position in said generally cross-machine direction.

3. The apparatus of claim 2 further comprising at least one reciprocating member coupled respectively to the at least one breaking member, wherein the at least one reciprocating member moves the at least one breaking member between the first position and the second position.

4. The apparatus of claim 3 wherein the at least one reciprocating member slides along a track supported by a second rotating drum coaxially mounted adjacent said first rotating drum about said rotation axis.

5. The apparatus of claim 1 further comprising a perforator adapted to form the at least one perforation in the web.

6. The apparatus of claim 1 wherein the tensioning device comprises a tensioning drum adapted to receive the web from the web conveyor.

7. The apparatus of claim 1 wherein said at least one breaking member has a generally triangular cross-section.

8. An apparatus for breaking a perforation of a moving web, comprising:

a web conveyor adapted to move a web in a machine direction, wherein said web has at least one perforation;

at least one breaking member moveable between a first position and a second position, wherein the at least one breaking member is adapted to be positioned remote from the at least one perforation at the first position and is adapted to be positioned adjacent the at least one perforation at the second position;

a tensioning device adapted to sufficiently tension the web against the at least one breaking member such that the at least one perforation is broken; and a fastener applicator adapted to place at least one fastener member onto the web.

9. The apparatus of claim 8 wherein the fastener applicator is adapted to place the at least one fastener member over the at least one perforation.

10. A system for breaking a perforation of a moving web, comprising:

a web conveyor moveable in a machine direction, said web conveyor comprising a first rotating drum rotatable about a rotation axis extending in a generally cross-machine direction;

a web having at least one perforation, wherein the web is supported by the web conveyor and is moveable therewith in the machine direction;

at least one breaking member moveable between a first position and a second position, wherein the at least one breaking member is positioned remote from the at least one perforation at the first position and is positioned adjacent the at least one perforation at the second position, and wherein said at least one breaking member is rotatable about said rotation axis; and a tensioning device tensioning the web against the at least one breaking member as the web is moved in the machine direction.

11. The system of claim 10 wherein the at least one breaking member is moveable between the first position and the second position in said generally cross-machine direction.

12. The system of claim 11 further comprising at least one reciprocating member coupled respectively to the at least one breaking member, wherein the at least one reciprocating member moves the at least one breaking member between the first position and the second position.

13. The system of claim 12 wherein the at least one reciprocating member slides along a track supported by a second rotating drum coaxially mounted adjacent said first rotating drum about said rotation axis.

14. The system of claim 10 further comprising a perforator forming the at least one perforation in the web.

15. The system of claim 10 wherein the tensioning device comprises a tensioning drum supporting the web as the web moves in the machine direction.

16. The system of claim 10 wherein said at least one breaking member has a generally triangular cross-section.

17. A system for breaking a perforation of a moving web, comprising:

a web conveyor moveable in a machine direction;

a web having at least one perforation, wherein the web is supported by the web conveyor and is moveable therewith in the machine direction;

at least one breaking member moveable between a first position and a second position, wherein the at least one breaking member is positioned remote from the at least one perforation at the first position and is positioned adjacent the at least one perforation at the second position;

a tensioning device tensioning the web against the at least one breaking member as the web is moved in the machine direction; and a fastener applicator placing at least one fastener member onto the web as the web moves in the machine direction.

18. The system of claim 17 wherein the fastener applicator places the at least one fastener member over the at least one perforation.

19. A method for breaking a perforation formed in a moving web, comprising:

moving a web in a machine direction, the web having at least one perforation, wherein said moving said web in said machine direction comprises supporting a first side of said web on a first rotating drum, rotating said first rotating drum about a rotation axis extending in a generally cross-machine direction, and moving said web with said first rotating drum;

moving at least one breaking member between a first position remote from the at least one perforation, and a second position adjacent the at least one perforation;

rotating the at least one breaking member about said rotation axis; and applying a tensioning force to the web and thereby breaking the at least one perforation with the at least one breaking member.

20. The method of claim 19 wherein the moving the at least one breaking member between the first and second positions comprises moving the at least one breaking member in said generally cross-machine direction.

21. The method of claim 20 wherein moving the at least one breaking member in said generally cross-machine direction comprises reciprocating the breaking member in the generally cross-machine direction.

22. The method of claim 21 wherein said reciprocating the breaking member in the generally cross-machine direction comprises moving a reciprocating member along a track on a second rotating drum, wherein said reciprocating member is coupled to said at least one breaking member.

23. The method of claim 19 wherein the moving the at least one breaking member between the first and second positions comprises moving the at least one breaking member over a second side of the web opposite the first rotating drum, wherein the web is disposed between the at least one breaking member and the first rotating drum.

24. A method for breaking a perforation formed in a moving web, comprising:

moving a web in a machine direction, the web having at least one perforation;

moving at least one breaking member between a first position remote from the at least one perforation, and a second position adjacent the at least one perforation;

applying a tensioning force to the web and thereby breaking the at least one perforation with the at least one breaking member; and applying at least one fastener member onto the web.

25. The method of claim 24 wherein the applying the at least one fastener member onto the web comprises applying the at least one fastener member over the at least one perforation.

26. A method for breaking a perforation formed in a moving web, comprising:

moving a web in a machine direction, the web having at least one perforation, wherein said moving said web in said machine direction comprises supporting a first side of the web on a rotating drum and moving the web with the rotating drum;

moving at least one breaking member between a first position remote from the at least one perforation, and a second position adjacent the at least one perforation, wherein said moving the at least one breaking member between the first and second positions comprises moving the at least one breaking member over a second side of the web opposite the rotating drum, wherein the web is disposed between the at least one breaking member and the rotating drum;

applying a tensioning force to the web and thereby breaking the at least one perforation with the at least one breaking member; and applying at least one fastener member onto the second side of the web across the at least one breaking member.

27. The method of claim 26 wherein said applying a tensioning force to the web and thereby breaking the at least one perforation comprise pulling the at least one breaking member through the web at the at least one perforation.

28. The method of claim 27 wherein said at least one breaking member has a generally triangular cross-section having an apex engaging the second side of the web.

* * * * *